United States Patent [19]

Volk

[11] 4,189,953
[45] Feb. 26, 1980

[54] DRIVE SYSTEM FOR MENSURATION STAGES OR THE LIKE

[75] Inventor: Karl G. Volk, San Jose, Calif.

[73] Assignee: SemPrex Corporation, Campbell, Calif.

[21] Appl. No.: 787,884

[22] Filed: Apr. 15, 1977

[51] Int. Cl.$^2$ .................. B23Q 3/18; G02B 21/26; G05G 11/00

[52] U.S. Cl. .................................. 74/479; 108/143; 267/73; 350/86

[58] Field of Search ............... 74/479; 33/1 M, 23 C; 108/137, 143; 267/71, 73; 350/86

[56] References Cited

U.S. PATENT DOCUMENTS

| | | | |
|---|---|---|---|
| 3,241,243 | 3/1966 | Speer | 33/1 M X |
| 3,428,387 | 2/1969 | Hall et al. | 108/137 |
| 3,517,624 | 6/1970 | Helms | 108/137 |
| 3,563,186 | 2/1971 | Piper et al. | 108/143 |

*Primary Examiner*—Allan D. Herrmann
*Attorney, Agent, or Firm*—F. D. LaRiviere

[57] ABSTRACT

The improved drive system for linearly translating the sample platform of a mensuration stage along two axes comprises two drive bars, each bar having one tapered lontitudinal edge. The X-Y position adjustment of the sample platform is controlled by two manually operable, coaxial controls which are coupled to V-grooved drive wheels. Leaf springs formed in the ends of each drive bar urge the tapered edge of each drive bar into enhanced, frictional engagement with a drive wheel. Each end of the drive bars are also formed to cause the drive bar to frictionally disengage from the drive wheel as the sample platform is driven to its limit in either direction along either axis.

10 Claims, 5 Drawing Figures

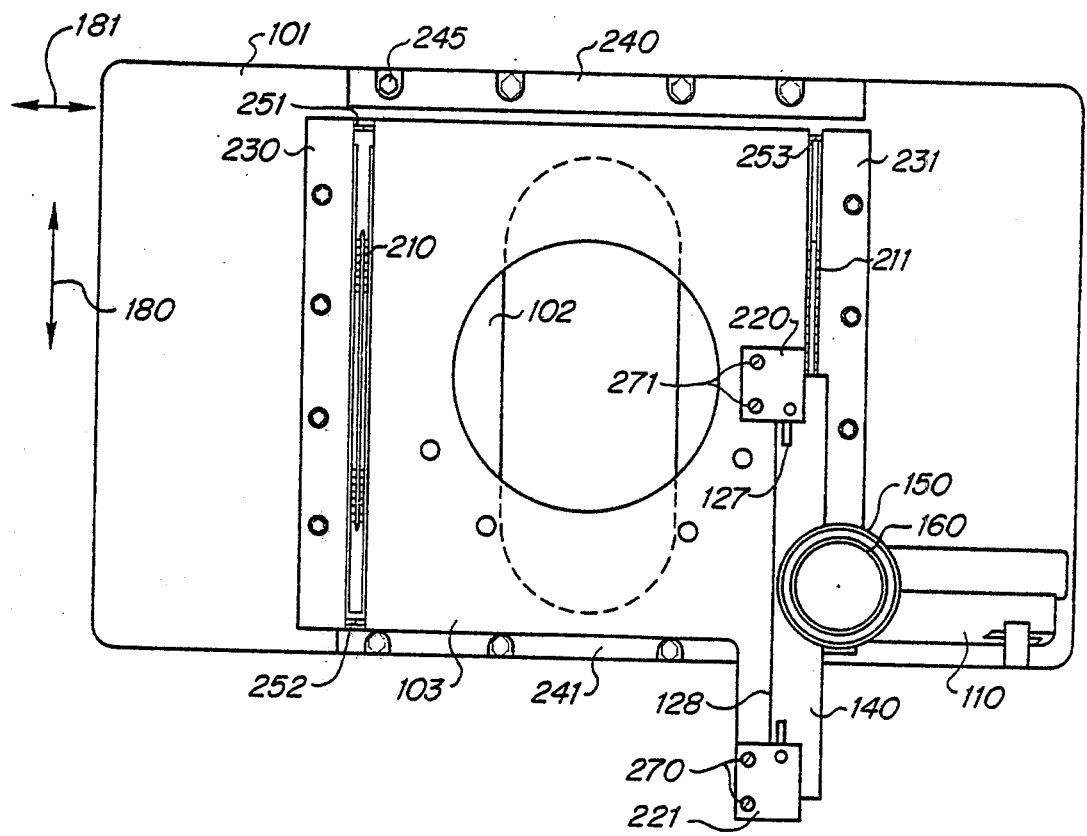
Figure 2
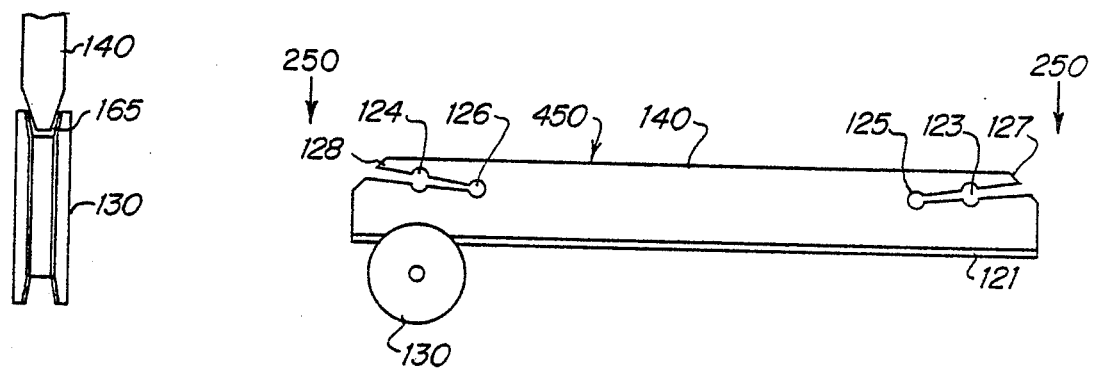
Figure 5
Figure 4

DRIVE SYSTEM FOR MENSURATION STAGES OR THE LIKE

BACKGROUND & SUMMARY OF THE INVENTION

Some previous microscope stages have used gear drive or rack and pinion systems to position a microscope stage. See, for example, U.S. Pat. No. 3,826,559 issued to Berliner, et al. on July 30, 1974 and entitled "Adjustable Tension Control Means for Microscopes" and also U.S. Pat. No. 3,572,888 issued to Takashi Kawashima on Mar. 30, 1971, and entitled "Rotary and Transversely Adjustable Microscope Stage."

Typically, these systems have the disadvantage that the larger the size of the gears used in the system, the more backlash there is in the adjustment of the stage and instability at the adjusted position. Such backlash is caused by the greater the tolerances allowable in the meshing of the gears, and hence the position of the sample platform may vary without any corresponding change in the position of the associated controls.

Alternatively, a gear system having very fine-toothed gears is frequently damaged when the stage is overdriven, i.e., driven to its full extension along one axis. Overdriving the stage is common since the operator is typically not looking directly at the stage controls during the adjustment operation.

Other adjustment techniques include screw drive and micrometer drive techniques. See, for example, U.S. Pat. No. 3,652,146 entitled "Precision Microscope Stage" and issued to David Sydney George on Mar. 28, 1972, and also U.S. Pat. No. 3,525,140 entitled "Micro-Motion Device" and issued to R. P. Cachon, et al. on Aug. 25, 1970. These techniques presented problems similar to those discussed above.

In accordance with the preferred embodiment of the present invention, drive bars, each having a tapered longitudinal edge, are movably mounted to the sample platform and base plate of a mensuration stage. The base is fixedly mounted to the frame of the microscope or other apparatus. The tapered edge of the drive bars each frictionally engage a V-grooved drive wheel, each of which drive wheels being axially mounted to an intermediate plate of the stage and coaxially coupled to rotatably operable controls. Rotation of one of the controls drives only the platform along one axis. Rotation of the other control knob drives the intermediate plate, which is coupled to the sample platform, along the other axis. Thus, co-planar, X-Y positioning of the sample platform is provided. Leaf-springs formed in the ends of the drive bars urge the tapered edge of the drive bars into the groove of the drive wheels, thus enhancing the frictional engagement therebetween. In addition, each end of the tapered edges of the drive bars are shaped to cause the drive bar to frictionally disengage from the drive wheel as the sample platform is driven to its limit in either direction along either axis.

BRIEF DESCRIPTION OF THE DRAWINGS

FIG. 2 is a bottom view of the mensuration stage of FIG. 1.

FIG. 4 is a top view of the tapered-edge drive bar and grooved drive wheel employed in the mensuration stage of FIG. 1.

FIG. 5 is an enlarged, end-view of the tapered-edge drive bar and grooved wheel shown in FIG. 4.

DESCRIPTION OF THE PREFERRED EMBODIMENT

Figure 1:
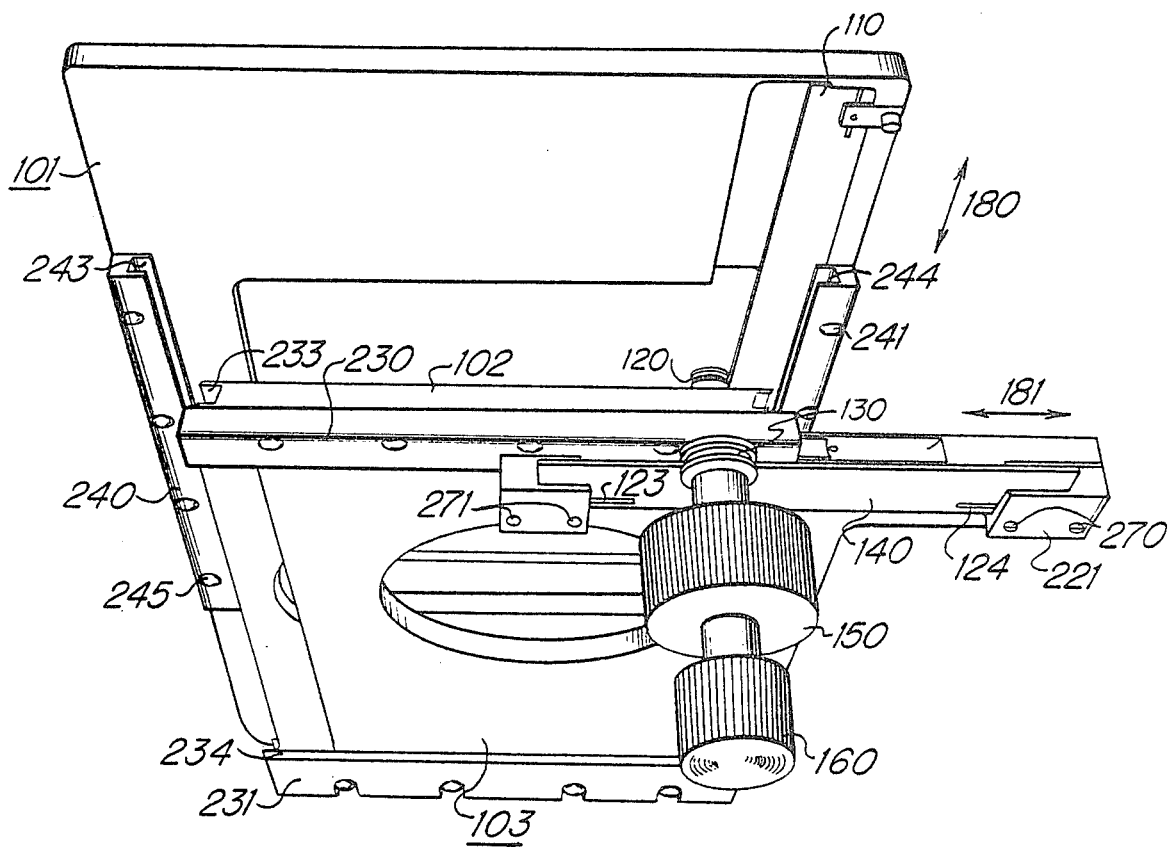
FIG. 1 is a bottom perspective view of a mensuration stage having a drive system constructed according to the preferred embodiment of the present invention.

Referring to FIG. 1, typically base 103 is fixedly mounted to the frame of the microscope or other device which utilizes a mensuration stage. Such mounting is not shown in order to more clearly illustrate the present invention. Drive bar 140 is movably mounted to base 103 which is coupled to platform 101 via intermediate plate 102. Drive bar 110 is movably mounted directly to platform 101.

Rotation of manual control 150 applies rotational torque to drive wheel 130 which rolls along drive bar 140, linearly translating platform 101, intermediate plate 102 and coaxially coupled controls 150 and 160 in direction 181. Rotation of manual control 160 applies rotational torque to drive wheel 120, which translates drive bar 110 and platform 101 in direction 180. Thus, when platform 101 is moving in direction 181, intermediate plate 102 and manual controls 150 and 160 also translate in that direction. When platform 101 is moving in direction 180, intermediate plate 102 and manual controls 150 and 160 remain stationary relative thereto.

Guide channels 233 and 234 are formed between base 103 and brackets 230 and 231, respectively, which are secured to plate 102. In like fashion, brackets 240 and 241, which are affixed to platform 101, form guide channels 243 and 244, respectively, between the brackets and plate 102. Brackets 230 and 231 are fastened to plate 102 and brackets 240 and 241 are fastened to platform 101 by screws such as 245.

Figure 3:
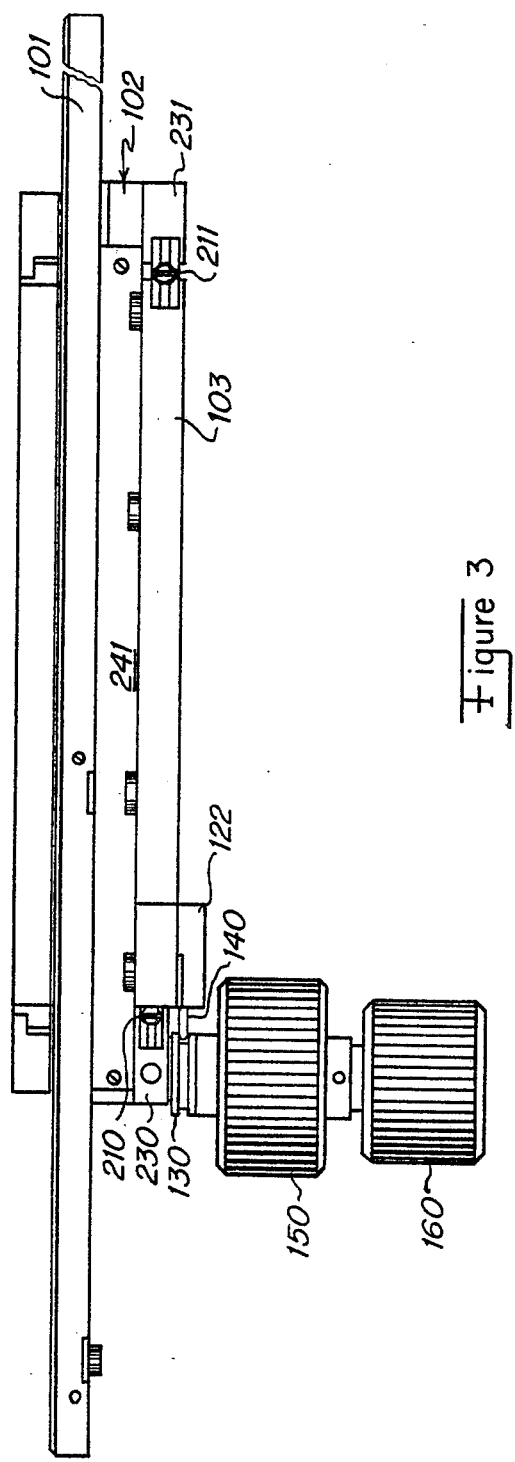
FIG. 3 is a side view of the mensuration stage of FIG. 1.

Referring also to FIG. 3, ball bearings ride between each plate and its respective mounting brackets to smooth the relative movement of the plate and brackets. The preferred embodiment uses precision ground and honed, single piece ball bearing races such as assemblies 210 and 211.

Referring now to FIG. 4, drive bar 140, having tapered longitudinal edge 121, frictionally engages drive wheel 130. The tread of drive wheel 130 is grooved as, for example, V-groove 165, for engagement with the tapered edge 121 of a drive bar, as shown in FIG. 5. Drive wheel 120 engages drive bar 110 in the same manner.

Drive bar 140 is movably mounted to platform 103 by screws 270 and 271 through slotted holes 123 and 124 in mounting hardware 220 and 221. However, since slots 125 and 126 are larger than the mounting screws used, deflection of leaf springs 127 and 128 is uninhibited. Normally, edge 450 of drive bar 140 is positioned against a firm support such as mounts 220 and 221 (shown in FIG. 2). The deflection of leaf springs 127 and 128 in direction 250 urges drive bar 140 into drive wheel 130, thus enhancing the frictional engagement therebetween. Drive bar 110 similarly engages drive wheel 120.

Referring now to FIGS. 2 and 3, when drive bar 140 is mounted, leaf springs 127 and 128 are deflected in direction 250 to provide urging force between drive bar 140 and drive wheel 130. Adjustment of leaf spring deflection is provided by set screws 270 and 271 in mounting hardware 220 and 221. Adjustment of these set screws causes greater or lesser deflection of leaf springs 127 and 128, respectively, thus increasing or decreasing the frictional force between drive bar 140 and drive wheel 130. Similar mounting and adjustment means are provided for drive bar 110 with drive wheel 120.

Referring again to FIG. 2, stops are provided to stop the travel of platform 101 and intermediate plate 102 in either direction along either axis. For example, the plate is stopped when the ball bearing race assemblies, 210, 211 hit the stops at the end of their respective channels. Thus, assuming base 103 is fixedly mounted, platform 101 and intermediate plate 102 translate toward the bottom of FIG. 2 as control 150 is turned in clockwise rotation. At the maximum extended position, assemblies 210 and 211 would engage stops 251 and 253 and prevent the further, intermediate plate 102 and platform 101 with respect to base 103.

When a fully extended position is reached, i.e., ball bearing assemblies 210 and 211 engage stops 251 and 253 and no further movement of the drive bar and the plate is possible in that direction, drive wheel 130 and drive bar 140 frictionally disengage as additional rotational torque is applied to manual control 150. Disengagement of drive bar 140 from drive wheel 130 is caused by relieving the deflection of leaf spring 127 which in turn removes the frictional force between drive bar 140 and drive wheel 130. Such frictional force is maintained so long as drive wheel 130 engages drive bar 140 between slot 125 and 126. When drive wheel 130 engages drive bar 140 between slot 125 and the end of drive bar 140, or between slot 126 and the other end of drive bar 140, the frictional force is relieved. In this way, no damage to the drive mechanism of the preferred embodiment results if the user continues to rotate control 150. Of course, similar mounting hardware is used for mounting drive bar 110, resulting in analogous control of the frictional force imposed by it.

I claim:

1. Drive apparatus for translating the sample platform along a first axis of a mensuration stage, said drive apparatus comprising:
    an intermediate plate coupled to the sample platform;
    a first drive wheel having a grooved tread axially mounted on the intermediate plate of the mensuration stage;
    a first drive bar movably mounted along the first axis of the sample platform having a tapered longitudinal edge for frictionally engaging the grooved tread of the drive wheel; and
    first manually rotatable control means axially coupled to the first drive wheel for linearly translating the drive bar in response to rotational torque applied to said first control means.

2. Drive apparatus as in claim 1 wherein:
    the sample platform includes first and second adjustable deflection means for coupling the first drive bar to said sample platform near each end of said first drive bar; and
    the first drive bar includes first and second bias means for urging said first drive bar into the first drive wheel to enhance the frictional engagement therebetween in response to the first and second deflection means when the first drive wheel engages the first drive bar between the first and second deflection means.

3. Drive apparatus as in claim 2 wherein the first and second bias means each comprise a leaf spring formed in each end of the first drive bar.

4. Drive apparatus as in claim 2 wherein the first and second bias means frictionally disengage the first drive bar from the first drive wheel when the first drive wheel engages the first drive bar between the first and second deflection means and the associated end of the first drive bar.

5. Drive apparatus as in claim 4 wherein the first drive wheel includes a V-groove tread.

6. Drive apparatus as in claim 1 for translating the sample platform along a second axis of a mensuration stage, said drive apparatus further including:
    a base coupled to the intermediate plate;
    a second drive wheel having a grooved tread, coaxially mounted with the first drive wheel to the intermediate plate of the mensuration stage;
    a second drive bar movably mounted to the base, parallel to the second axis of the sample platform, having a tapered longitudinal edge for frictionally engaging the grooved tread of the second drive wheel; and
    second manually rotatable control means coaxially coupled to the second drive wheel with the first control means and first drive wheel for linearly translating the sample platform, intermediate plate and second drive wheel along the second drive bar in response to rotational torque applied to said second control means.

7. Drive apparatus as in claim 6 wherein:
    the base includes third and fourth adjustable deflection means for coupling the second drive bar to said base near each end thereof; and
    the second drive bar includes third and fourth bias means for urging said second drive bar into the second drive wheel to enhance the frictional engagement therebetween in response to the third and fourth deflection means where the second drive engages the second drive bar between the first and second deflection means.

8. Drive apparatus as in claim 7 wherein the third and fourth bias means each comprises leaf spring formed in each end of the second drive bar.

9. Drive apparatus as in claim 7 wherein the third and fourth bias means frictionally disengage the second drive bar from the second drive wheel when the second drive wheel engages the second drive bar between the third or fourth deflection means and the associated end of the second drive bar.

10. Drive apparatus as in claim 9 wherein the second drive wheel includes a V-groove tread.

* * * * *